(12) United States Patent
Rashkovskiy et al.

(10) Patent No.: US 8,782,437 B2
(45) Date of Patent: *Jul. 15, 2014

(54) CONTENT PROTECTION USING BLOCK REORDERING

(75) Inventors: Oleg Rashkovskiy, Cupertino, CA (US); Eric C. Hannah, Pebble Beach, CA (US)

(73) Assignee: Intel Corporation, Santa Clara, CA (US)

(*) Notice: Subject to any disclaimer, the term of this patent is extended or adjusted under 35 U.S.C. 154(b) by 164 days.

This patent is subject to a terminal disclaimer.

(21) Appl. No.: 13/316,773

(22) Filed: Dec. 12, 2011

(65) Prior Publication Data

US 2012/0082310 A1    Apr. 5, 2012

Related U.S. Application Data

(62) Division of application No. 09/706,501, filed on Nov. 2, 2000, now Pat. No. 8,281,155.

(51) Int. Cl.
*H04L 9/28* (2006.01)
*H04K 1/00* (2006.01)

(52) U.S. Cl.
USPC ............... 713/193; 380/28; 380/44; 380/210

(58) Field of Classification Search
None
See application file for complete search history.

(56) References Cited

U.S. PATENT DOCUMENTS

| | | | | |
|---|---|---|---|---|
| 5,926,610 | A * | 7/1999 | Sugiyama et al. | 386/329 |
| 6,061,449 | A * | 5/2000 | Candelore et al. | 380/28 |
| 6,577,734 | B1 * | 6/2003 | Etzel et al. | 380/277 |
| 7,054,445 | B2 * | 5/2006 | Gligor et al. | 380/37 |
| 7,873,982 | B2 * | 1/2011 | Smith et al. | 725/136 |
| 8,204,217 | B2 * | 6/2012 | Bjorkengren et al. | 380/28 |
| 8,281,155 | B1 * | 10/2012 | Rashkovskiy et al. | 713/193 |
| 2009/0257586 | A1 * | 10/2009 | Takahashi et al. | 380/55 |

* cited by examiner

*Primary Examiner* — Christopher Revak
(74) *Attorney, Agent, or Firm* — Trop, Pruner & Hu, P.C.

(57) ABSTRACT

An apparatus and method for protecting a content item such as a digitally encoded movie, an electronic programming guide, or the like, by reordering blocks of the content item prior to transmitting it to a receiving device. The receiving device constructs a block reordering structure which is used to access the reordered content item, to facilitate retrieval of a desired block from the original content item. The reordering may be done responsive to an identifier value of the receiving device, such as a serial number.

26 Claims, 5 Drawing Sheets

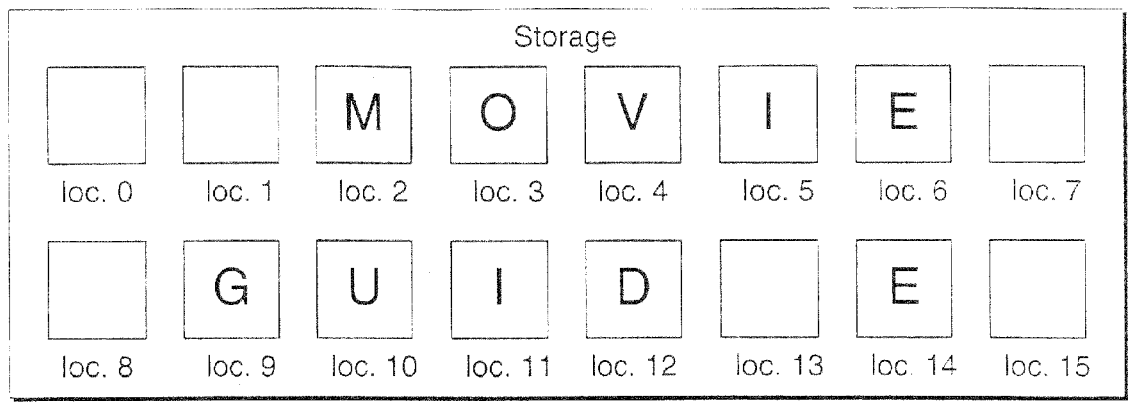
Fig. 2A - prior art
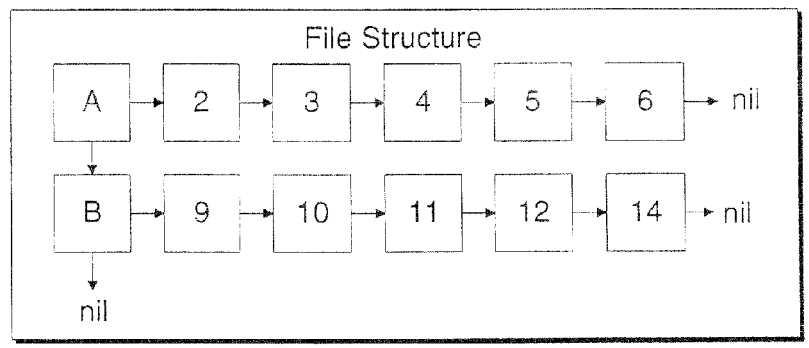
Fig. 2B - prior art

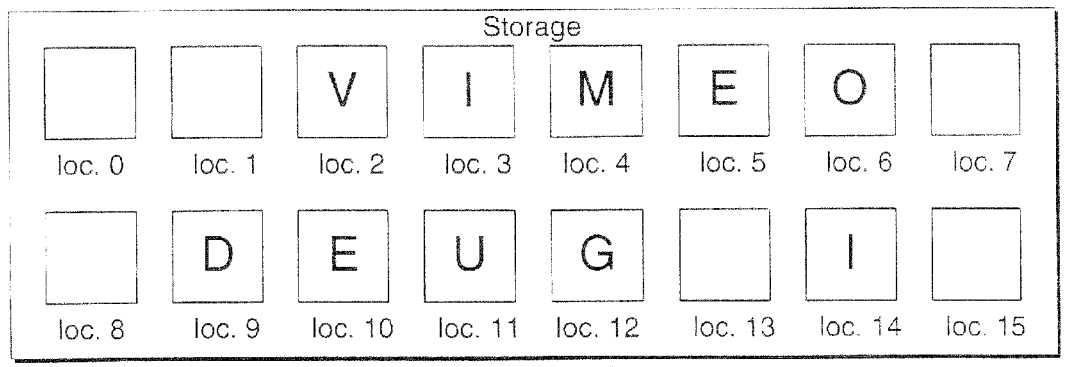
Fig. 3A
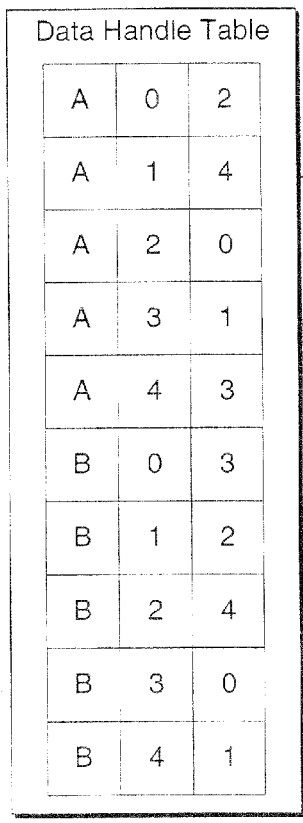
Fig. 3C
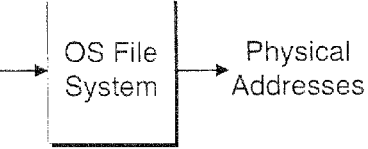
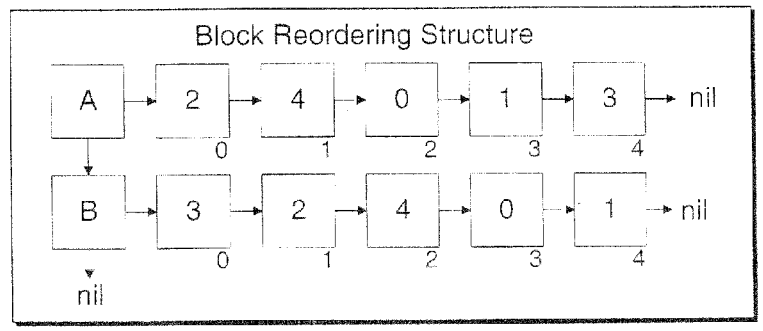
Fig. 3B

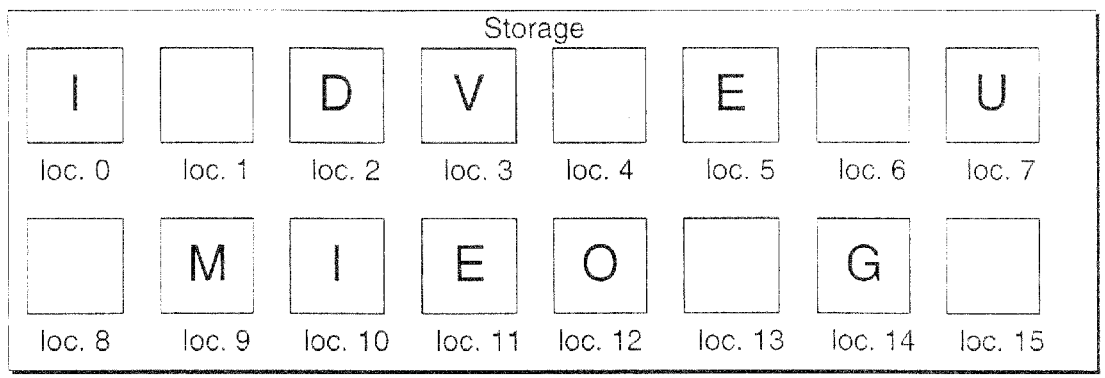
Fig. 4A
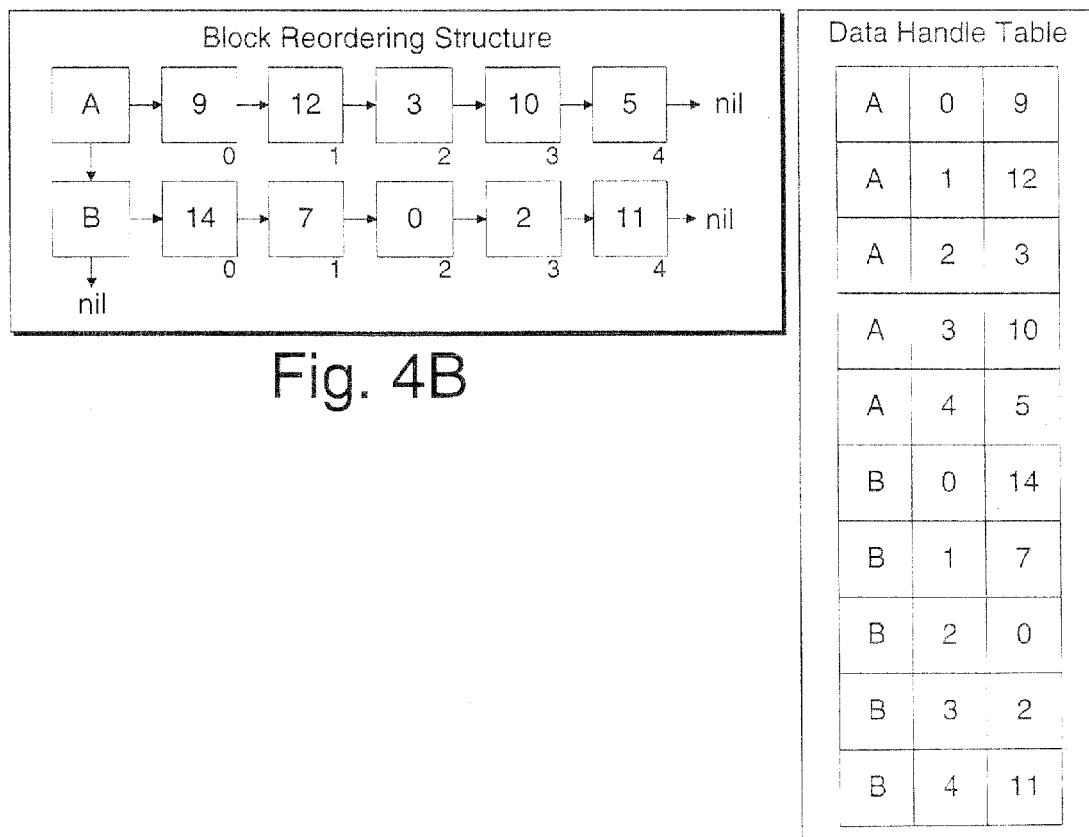
Fig. 4B
Fig. 4C

CONTENT PROTECTION USING BLOCK REORDERING

This application is a divisional of U.S. patent application Ser. No. 09/706,501, filed on Nov. 2, 2000, which is now U.S. Pat. No. 8,281,155.

BACKGROUND OF THE INVENTION

1. Technical Field of the Invention

The present invention relates generally to data security, and more specifically to a technique for protecting digital content by reordering blocks of a data set.

2. Background Art

Various types of data are transmitted or otherwise transferred from one entity, such as a server, to another entity, such as a client computer or a television set-top box, via various communication paths such as broadcast, wireless, cable, modem, LAN, DSL, CD-ROM "sneakernet", and so forth. The content of such data transmissions may be, for example, digital video, digital audio, database, graphics, spreadsheet, text, or any other form of content. The content may contain a movie, a song, a book, a television show, an electronic programming guide (EPG), an advertisement, advanced television enhancement information (ATVEF), a digital gift certificate, a digital coupon, an executable file, a data file, or any other content whatsoever. When this patent discusses examples such as a cable television company server sending an EPG to a subscriber's set-top box, the reader will understand that the invention is not necessarily limited to the specific example given, but rather that the example is given to help the reader understand the invention.

Content providers may desire to prevent corruption and/or piracy of their content, not only during transmission but also thereafter during such time as the content is stored at the receiving entity. One mechanism commonly employed to protect content is encryption, in which the digital values within the content are altered according to a cipher prior to their transmission. Many encryption schemes and methodologies are well known in the art, and will not be discussed in detail in this patent. It is assumed that the skilled reader is familiar with the relevant art.

It is also well understood that encryption of a large data set, such as a full-length movie, requires a relatively large amount of computational power and time, and that not all applications lend themselves to expense of power and/or time. This may be especially true of content which has limited economic value or which has a sufficiently short useful lifetime. The lower the value of the content, and the shorter its useful lifetime, the less justification there may be for using expensive encryption technologies to protect that content.

It is also understood that there may be many avenues of attack against content protection, with different levels of risk. Content may be attacked by different sets of actors using different sets of tools. In general, the easier and less expensive the attack, the larger the set of people who will be engaged in it. For some types of content, it may not be necessary— economically or otherwise—to protect content against all types of attack by all classes of people. For example, while the owner of a major motion picture may deem it necessary to provide strong encryption on every byte of the content at all stages of transmission and storage, the owner of an electronic programming guide covering only the next few days' broadcasts may deem it sufficient to use a weaker (and less costly) protection mechanism.

Some content, such as perhaps a nation's military secrets, may be so valuable that, in the example of a computer, it is not only desirable to protect the content which is stored on the hard drive, but further to prevent snooping attacks directed against internal wires, electromagnetic emanations from the keyboard and CRT, and so forth, on occasion even including the use of self-detonating chips which destroy themselves and their contents if someone attempts to break them open to peer inside with an electron microscope. On the other end of the spectrum, some content may be adequately protected if it is simply protected against software attacks such as those done via debuggers or memory dumps.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

FIG. 2A shows how content is stored according to the prior art.

FIG. 2B shows how one type of file system operates according to the prior art, such as may be used in a system which operates as shown in FIG. 2A.

FIG. 3A shows how content is stored according to one embodiment of this invention, in which blocks of respective files are reordered within the separate storage areas allocated to such files.

FIG. 3B shows how a file system may operate according to the embodiment of this invention illustrated in FIG. 3A.

FIG. 3C shows a data handle table which may be utilized by another embodiment of a file system which operates according to the principles of FIG. 3A.

FIG. 4A shows how content is stored according to another embodiment of this invention, in which blocks of files are reordered within the overall storage space.

FIG. 4B shows how a file system may operate according to the embodiment illustrated in FIG. 4A.

FIG. 4C shows a data handle table for a file system which operates as illustrated in FIG. 4A.

DETAILED DESCRIPTION

Figure 1:
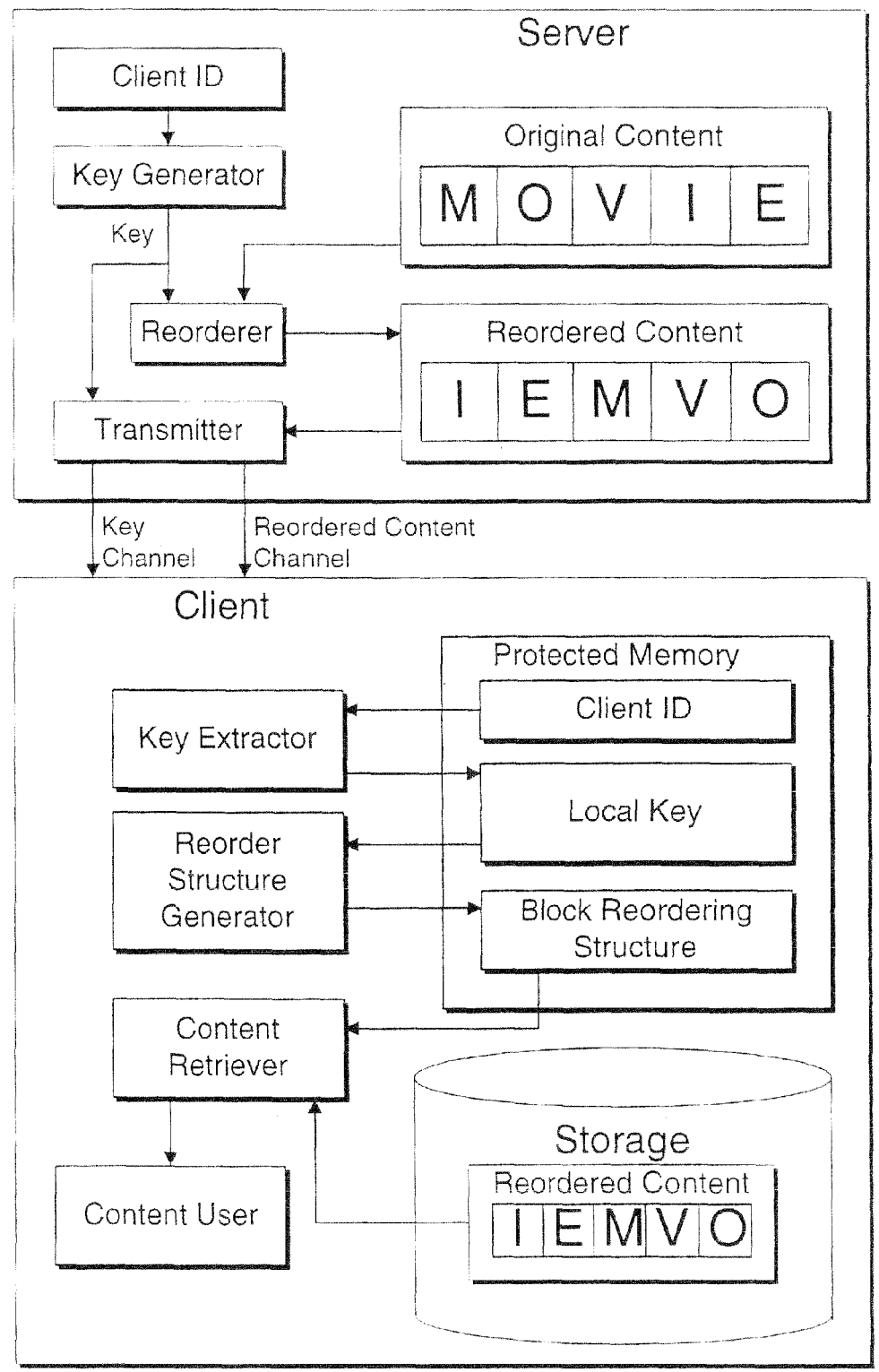
FIG. 1 shows one embodiment of a system which employs this invention, including a server and a client.

FIG. 1 shows a system 50 including a Server in communication with a Client. As mentioned above, these are only illustrative examples, and the invention is not limited to server/client applications.

The Server contains or has access to some Original Content which is desired to protect against attack. Rather than transmit the Original Content in its unsecured form to the Client (because the Original Content could be intercepted along its transmission path), the Server performs operations upon the Original Content to create Reordered Content. This may optionally be done in conjunction with conventional encryption, but it is not necessary.

In these operations performed by the Server, blocks of the Original Content are rearranged according to an algorithm. In one embodiment, the algorithm employs a random number generator (not shown) to select reordered positions for blocks. In one embodiment, it may further select a block size using the random number generator. A predetermined reordering pattern could be employed, but a more non-deterministic scheme may offer greater security.

In some applications, the reordering scheme may be employed to permit a single, specified client to utilize the transmitted content, while blocking access by all others—for example, a cable operator may wish to permit only a specified, individual, fee-paying client to view a particular pay-per-view movie (or rather, a particular reordered version thereof). In other applications, the reordering scheme may be employed to permit a multitude of clients to utilize the transmitted content while preventing others from utilizing it—for example, in a cable television system in which a common coaxial cable network is shared by a plurality of cable television operators, each operator may wish to permit any and all of its own subscribers to view a particular movie, while preventing the other cable operators' subscribers from viewing it.

The blocks which are being rearranged may be the same size, or they may vary in size. Same size lends itself to simpler processing, while varying size may lend itself to improved security.

In FIG. 1, the Client is shown as containing a Client ID. This could be a unique identifier such as a serial number, or it could be a possibly-unique identifier such as a random prime number or the like. Alternatively, the Client ID could be unique to a group (such as all cable boxes provided by this cable operator, or all cable boxes provided by this cable operator to purchasers of a certain subscription level).

In some embodiments, the Server may contain a copy of each Client's Client ID. For example, the Server can simply keep a list of Client IDs as new Clients are provisioned by the Server; alternatively, the Client could communicate its Client ID to the Server under a public-key encrypted and certificate-verified dialog. The Client ID could be a permanent feature of the individual Client, or it could be e.g. a session key generated by the client and securely communicated to the Server by known data security means.

Once the Server is in possession of the Client ID, it uses a Key Generator to produce a reordering Key. A Reorderer takes as input the Original Content, and, in a manner dictated by the reordering Key, generates the Reordered Content. Different Clients may have different Client IDs, with the result that for the same Original Content, their respective Reordered Content may well be in different orders and neither Client will be able to restore the Original Content from the other's Reordered Content.

The Server may include a Transmitter which sends the Reordered Content to the Client over a Reordered Content Channel of a communication medium. The Transmitter may also send the Key to the Client over a Key Channel of the same or a different communication medium. Alternatively, the Reordered Content and/or Key can be written to a storage medium (such as in FIG. 6) and delivered to the Client manually.

The Client contains Storage where the Reordered Content is stored. This may be a hard drive, an optical drive, semiconductor memory, or any other suitable storage means. The Reordered Content may be stored in a read-once manner, or it may be stored in a cache replacement manner until it is eventually evicted, or it may be stored permanently, or according to whatever storage needs the application dictates.

In one embodiment, the Client contains a Key Generator which generates a Local Key as a function of the Client ID, in a manner corresponding to the generation of the Reordering Key by the Server. The Local Key is the functional inverse of the Reordering Key. In other embodiments, the Local Key can be generated by the Server and transmitted over the Key Channel to the Client; in this case, the Client will not need a Key Generator.

In some embodiments, the Local Key is used repeatedly for all content received from the Server. In other embodiments, each content item, such as each respective movie, may have its own Local Key generated according to the Client ID and some other input such as a timestamp or a value from the content itself. There is no strict requirement that the same reordering key be used for an entire logical content item; in some embodiments, it may be desirable to switch keys one or more times during reordering of a lengthy content item. This may improve security, without unduly increasing system complexity.

The Client further contains a Reorder Structure Generator which utilizes the Local Key to create a Block Reordering Structure, which is in turn used by a Content Retriever to access the Reordered Content according to its original order for use by a Content User. Note that this does not necessarily mean that the Reordered Content must be accessed in linear fashion; the Block Reordering Structure may permit random access, as well. The Content Retriever may be, for example, a hardware disk drive controller. The Content User may be, for example, a software process or task spawned to display the movie.

For improved security, the Client ID, Local Key, and/or Block Reordering Structure may be kept in Protected Memory. In some applications, it may be sufficient that this memory be protected by conventional operating system (OS) schemes whereby one process can be denied access to another process's memory area. In other applications, it may be necessary to take further protective measures, such as by using self-destructive memory devices for the Protected Memory to prevent them being read via means more intrusive than mere software attacks. It may also be necessary to protect busses, wires, and other points of potential physical attack. It may be desirable to prevent physical access such as by burying the protected memory in a layer of plastic. Those technologies are well-known, and may be utilized in practicing this invention, but it is not necessary to discuss their particulars here.

FIG. 2A illustrates how content may be stored in a storage device (generally analogous to the Client's Storage in FIG. 1) according to the prior art. In the example shown, two separate content items are shown stored in the storage—one containing "MOVIE" and one containing "GUIDE". The reader will understand that these content items are not necessarily textual, and that the respective blocks of each do not necessarily contain only a single byte value. These simplistic examples are shown merely for illustrative purposes.

In the storage, there are multiple storage location blocks, generally illustrated by locations 0 to 15 in FIG. 2A. The first content item, "MOVIE", is illustrated as being stored in contiguous locations 2-6. The second content item, "GUIDE", is illustrated as being stored in non-contiguous locations 9-12, 15. In many common applications, such as a personal computer, a content item such as a data file is not necessarily stored in contiguous physical locations, nor, indeed, in sequential physical locations. In such applications, the operating system or other control entity will keep track of where each logical block is physically stored. However, even in logically-addressed systems, the contents of a file are stored in linear fashion within that file's allocated storage.

FIG. 2B represents the addressing scheme itself, employed by the operating system. Content item A ("MOVIE") is stored in blocks 2-6, and content item B ("GUIDE") is stored in blocks 9-12,14, which the file system keeps track of via a linked list or other known method.

FIG. 3A illustrates one difference between this invention and the prior art. The same addressing scheme is employed in FIG. 3A as in FIG. 2A. However, the Storage in FIG. 3A contains reordered content: the "MOVIE" content item has been reordered "VIMEO", and the "GUIDE" content item has been reordered "DEUGI". The reordering of the content is orthogonal to the addressing scheme of the storage device.

FIG. 3B shows one embodiment of the Block Reordering Structure (of FIG. 1), in which linked lists are employed, to keep track of the reordered blocks of the stored content items. In accordance with the Client's ID and thus the Local Key (of FIG. 1), the Reorder Structure Generator has generated a structure indicating that the blocks of the content item A ("MOVIE") have been reordered such that the correct order is to retrieve the blocks from blocks 2, 4, 0, 1, and 3 in order; this is, of course, on top of any logical-to-physical addressing scheme employed. If the scheme of FIGS. 3A and 3B is employed, the initial ($0^{th}$) block of "MOVIE" is found by the Content Retriever accessing the initial ($0^{th}$) value ("2") from the respective portion ("A") of the Block Reordering Structure, then the operating system or other such entity will use this as an index (loosely speaking) into the File Structure, and will retrieve the physical location ("4") where that block ("M") is stored in the Storage device. The scheme works that way for any $N^{th}$ block, of course. And it works that way for other content items' retrieval, as well (such as item B, "GUIDE").

FIG. 3C shows an alternative embodiment of a Block Reordering Structure, in which it is a Data Handle Table, rather than a linked list. In the Data Handle Table, which could be a content-addressable memory for example, the locations of the reordered blocks are recorded in what is illustrated as the rightmost column. There needs to be some mechanism of associating these reordered locations with their regularly-ordered counterparts; one suitable option may simply be to record the corresponding values in what is illustrated as the center column. Finally, if the Client is to store more than one reordered content item at a time, there needs to be some mechanism of associating these ordered/reordered value pairs with the content item to which they pertain; one suitable option may be to record an identifier of the respective content item in what is illustrated as the leftmost column. Those skilled in the art will readily appreciate that other embodiments are within their understanding, when armed with this disclosure. For example, the leftmost column could be removed and could be replaced with a functionally similar scheme such as a table which includes one entry per content item, plus an index into the two-column Data Handle Table indicating the first entry for that content item, and that it could further include either an indication of how many sequential entries in the Data Handle Table belong to that content item, or an index to the final entry in the Data Handle Table for that content item. Furthermore, the center column could be removed in some embodiments, and the functionality of its contents could be replaced by logic which indexes into the rightmost column based on the logical block position of a desired block. Finally, it should be understood that if a logical addressing scheme is employed, there will be an OS File System or other such entity performing logical-to-physical address translation to produce Physical Addresses that are used to directly address the Storage medium.

FIG. 4A illustrates an embodiment which does not use logical addressing, and in which the Server has direct control over where in the Client's physically addressed Storage device Reordered Content items are stored. In such a scheme, the values stored in the Block Reordering Structure are physical addresses.

FIG. 4B illustrates how the file system may operate in controlling storage according to the physically-addressed, storage-wide reordering shown in FIG. 4A.

FIG. 4C illustrates an alternative embodiment in which the physical addresses are stored in a Data Handle Table rather than in a linked list. The reader will understand that the functionality of this table may be distributed in a manner similar to that discussed above regarding FIG. 3C.

Figure 5:
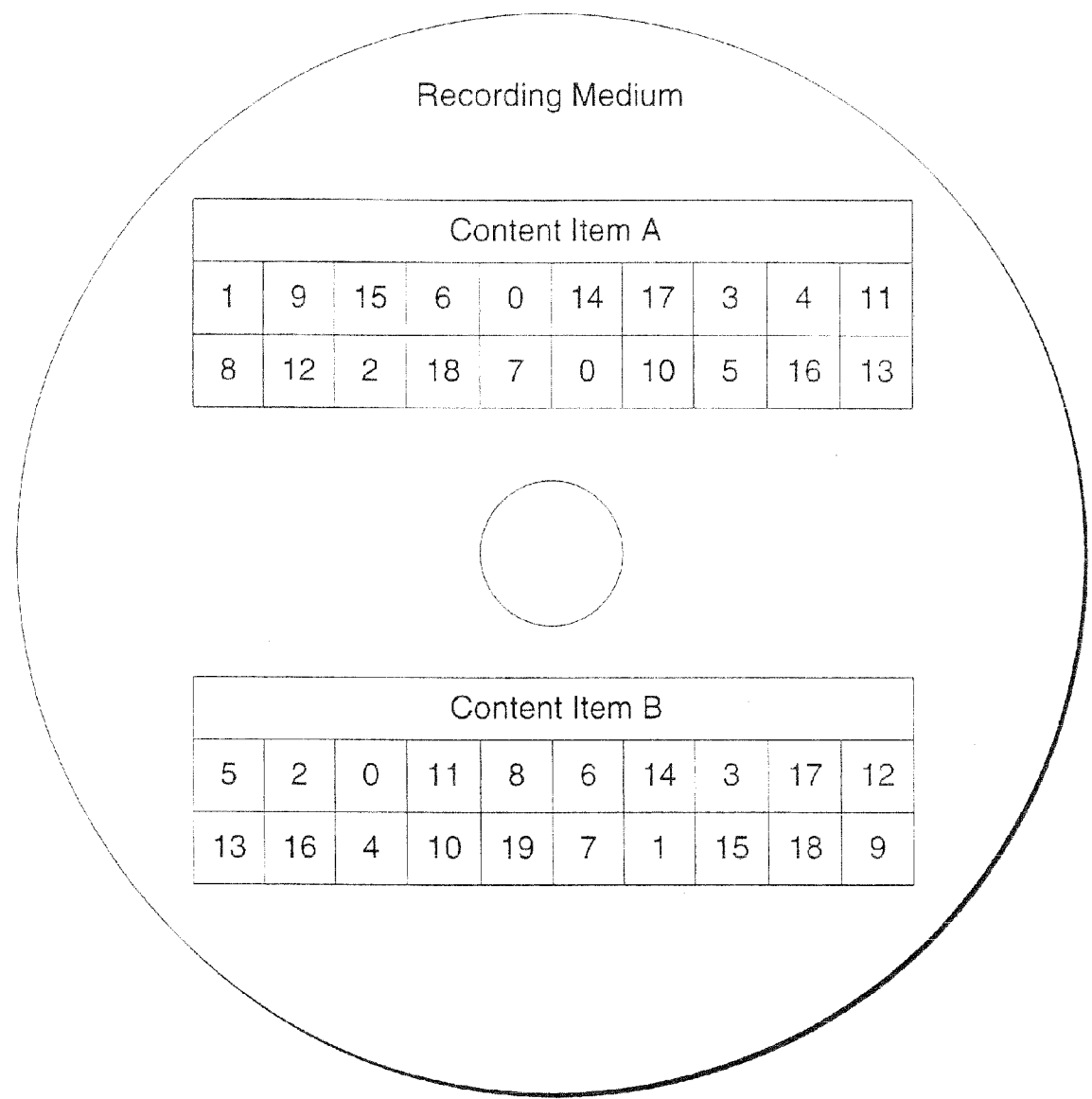
FIG. 5 illustrates a recordable medium having disposed thereon one or more reordered content items.

FIG. 5 illustrates a recordable medium having recorded thereon one or more block-reordered content items. This may be the storage device in the server, wherein is stored a reordered content item prior to or during transmission to a client. Or, it may be the storage device in the client which has received the reordered content item from the server. Or, it may be the transmission medium itself, in the case of a sneakernet delivery mechanism. Or, it could be an archival storage mechanism.

Reference in this specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. An apparatus comprising:
   storage for a local key;
   storage for a block reordering structure;
   a reorder structure generator to generate the block reordering structure according to the local key; and
   a content retriever to retrieve blocks of a content item in an original order according to the block reordering structure, wherein the blocks include a first block and a second block of different block sizes.

2. The apparatus of claim 1 further comprising:
   a storage device for receiving and storing a reordered content item from an external source.

3. The apparatus of claim 2 wherein the content retriever is adapted for retrieving the blocks in only sequential, linear order.

4. The apparatus of claim 2 wherein the content retriever is adapted for retrieving the blocks in random order.

5. The apparatus of claim 2 wherein the storage for the block reordering structure is a protected memory.

6. The apparatus of claim 5 wherein the protected memory is logically protected by an operating system of the apparatus.

7. The apparatus of claim 6 wherein the protected memory is physically protected against tampering.

8. The apparatus of claim 5 wherein the protected memory comprises means for preventing physical access to electrical signals and devices in the protected memory.

9. The apparatus of claim 1 wherein the block reordering structure comprises:

a plurality of entries, each entry correlating, for a respective original content block, a sequential order placement of that block in the content item with a sequential order placement of that block in a block-reordered version of the content item.

10. The apparatus of claim 9 wherein the plurality of entries comprises a linked list.

11. The apparatus of claim 9 wherein the plurality of entries comprises a table.

12. The apparatus of claim 1 wherein the reorder structure represents a logical addressing reordering of the blocks.

13. The apparatus of claim 1 wherein the reorder structure represents a physical addressing reordering of the blocks.

14. The apparatus of claim 1 further comprising means for receiving the content item in a reordered order from a distribution channel.

15. The apparatus of claim 14 wherein the distribution channel comprises a wireless broadcast channel.

16. The apparatus of claim 14 wherein the distribution channel comprises a coaxial cable.

17. The apparatus of claim 14 wherein the distribution channel comprises a digital subscriber line.

18. The apparatus of claim 14 wherein the distribution channel comprises a removable disk drive.

19. The apparatus of claim 1 wherein the reordered blocks retrieved by the content retriever are unencrypted copies of blocks of an original content item.

20. The apparatus of claim 1 wherein the blocks include a first block and a second block of a same block size.

21. The apparatus of claim 1 wherein the reordered content item comprises an electronic programming guide.

22. The apparatus of claim 1 wherein the reordered content item comprises ATVEF information.

23. The apparatus of claim 1 wherein the reordered content item comprises a digital gift certificate.

24. The apparatus of claim 1 wherein the reordered content item comprises an electronic coupon.

25. The apparatus of claim 1 wherein the reordered content item comprises a movie.

26. The apparatus of claim 1 wherein the reordered content item comprises an episode of a television show.

* * * * *